March 12, 1957
N. INGERSOLL, JR
2,784,490
ANATOMICALLY COLORED DENTURES
AND METHOD OF MAKING SAME
Filed Nov. 10, 1953
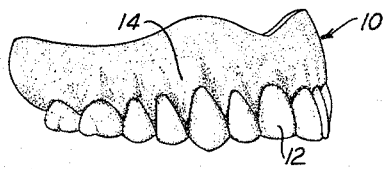
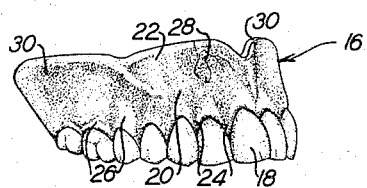
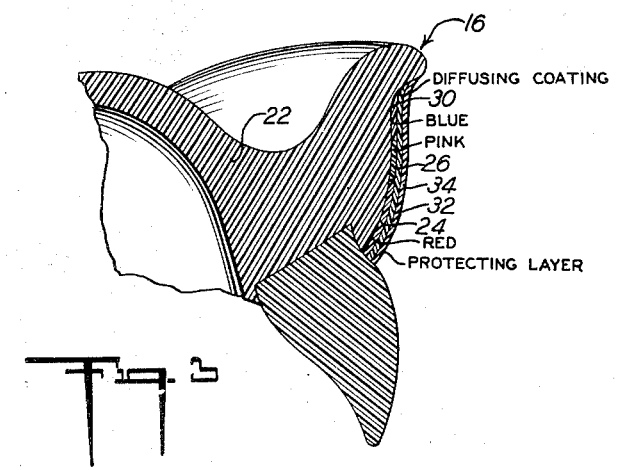
INVENTOR
NELSON INGERSOLL, JR.
BY Fisher + Christen,
ATTORNEYS

United States Patent Office 2,784,490
Patented Mar. 12, 1957

2,784,490

ANATOMICALLY COLORED DENTURES AND METHOD OF MAKING SAME

Nelson Ingersoll, Jr., Philadelphia, Pa., assignor of one-half to Earl Pound, Los Angeles, Calif.

Application November 10, 1953, Serial No. 391,359

6 Claims. (Cl. 32—2)

This invention relates to an intra-oral restoration and a process for forming the same. More particularly, it relates to the production of anatomically colored replicas or simultations of natural gum tissues on an intra-oral restoration such as an artificial denture, for example.

Until several decades ago, it was customary to utilize denture base material of so-called "vulcanite," which was a dark, reddish-brown rubber material, to form the base to which artificial teeth were attached in forming either partial or complete dentures. While this material was very rugged, relatively stable in shape, and durable, the color thereof was very unnatural and when the denture base material was exposed to view by the wearer, anyone seeing the same immediately knew the wearer possessed an artificial denture.

Better esthetics could be obtained at much greater expense by baking suitably colored enamel on a metallic denture base of noble metal but even dentures formed in this manner were generally a mono-tone, albeit more attractive than the vulcanite bases. Thus, the monotone pink usually used in such more expensive restorations frequently disclosed upon exposure that the dental restoration was artificial, said natural gum tissues almost invariably are vari-colored, being various patterns including red, orange, pink, blue and other shades, including mixtures thereof.

In recent years and particularly the past fifteen, methyl-methacrylate has been widely employed as a denture base material because it is strong, reasonable in price, light-weight, resistant to shrinking and warping, bondable directly with synthetic resin teeth and also well suited to being molded to anchoring means of porcelain teeth, resistant to fracture upon being dropped, and may readily be pigmented to a conventional pink. However, such pigmenting is of a decidedly monotone nature, whereby exposure of a denture embodying the same to view, quickly reveals to an observing public that the denture is artificial.

It is possible to individually pigment a porcelain denture base, for example, to be vari-lined and resemble natural vari-colored gum tissue quite closely. Such operation is in the nature of glazing porcelain and has to be fired. Obviously, the cost of such procedure is prohibitive to all of the denture requiring public except the most wealthy.

Further, in regard to methyl-methacrylate denture bases particularly, it has also been possible to produce varicolored replicas of natural gum tissues on such denture bases by packing a dental flask, in which the plaster or stone molds have been formed and in which artificial teeth have been lodged for bonding with the denture base material, with an artistic arrangement of various colors of polymerized methyl-methacrylate powder, applied by hand and bonded by monomer, against the mold wall. This procedure somewhat resembles forming a mosaic of vari-colored polymerized resin particles against the mold surface which is used to form the buccolabial surface of a molded and completed denture, the usual monotone denture base material then being packed behind said color arrangement for bonding thereto. The completely packed mold then is closed and cured. The thus molded denture is removed from the mold and subsequently polished. The high cost required for meticulous hand work of this type can well be imagined but the same is required in order to produce and bond a suitable color layer on the resin denture base material.

It is the principal object of the present invention to provide an anatomically colored intra-oral restoration and a process by which a highly natural appearing varicolored replica of normal gum tissues can be formed quickly and inexpensively particularly on the bucco-labial surfaces of either a completed or semi-completed intra-oral restoration by hand operations.

It is a further object of the invention to perform the foregoing process by means of small paint brushes used to apply preferably quick-drying pigmented lacquers to form a replica of gum tissues.

It is another object of the invention to provide in said process a step or steps of blending of various shades of pigmented vehicles or lacquers by means of a diffusing coat which also produces depth in the color layers and three-dimensional properties therein.

Still another object is to provide an intra-oral restoration having a vari-colored bucco-labial surface which is not only a natural appearing replica of healthy gum tissues but the color replica is protected by a transparent protective layer bonded to the restoration.

Details of the foregoing objects and of the invention, as well as other objects thereof are set forth in the following specification and illustrated in the accompanying drawing.

In the drawing:

Fig. 1 is a three-quarter view of an exemplary intra-oral restoration made in accordance with present practice utilizing, for example, a monotone pink, methyl-methacrylate or styrene denture base.

Fig. 2 is a view similar to Fig. 1 but showing an exemplary intra-oral restoration having a natural appearing, vari-colored bucco-labial surface thereon.

Fig. 3 is a fragmentary, enlarged sectional view taken along the median axis of the restoration shown in Fig. 2 and illustrating exemplary details of the color, blending, and glazing or protective coats or layers affixed to the base of a representative denture.

Referring to Fig. 1, wherein a conventional denture made by currently used techniques is illustrated, it will be understood that the denture base 10 is formed from methyl-methacrylate or styrene which is pigmented a conventional, monotone pink. A set of teeth 12, which may be either of porcelain or synthetic resin, are attached to said base 10 during the curing thereof. The bucco-labial surface 14 above the teeth 12 is usually contoured to resemble natural gum anatomy but, nevertheless when the monotone pink shade of the denture base is exposed to view, the same clearly indicates that the wearer possesses an artificial denture.

In producing a denture such as an upper plate 16, for example, which embodies the present invention, the denture base is molded and bonded to the teeth 18 according to conventional practice. This procedure establishes the desired contour on the denture and particularly the bucco-labial surface 20 thereon above the row of teeth 18. Preferably, the thus molded denture is at least nearly finished by buffing or polishing the exterior thereof prior to applying the present invention thereto.

The principal purpose of the present invention, as stated above, is to produce a natural appearing intra-oral restoration such as represented by the upper plate or denture 16 in Fig. 2. In order to disguise or mask the conventional monotone pink or other color of the base material 22, a set of containers filled respectively with various colored or pigmented vehicles such as lacquers are provided. These lacquers are of a nature which not only pigment the denture base as desired but will also bond firmly to the methyl-methacrylate or styrene base per se.

The desired lacquer vehicles for bases are composed of from 15 to 25% methyl-methacrylate powdered polymer dissolved in from 85 to 75% chloroform. The preferred percentage is 20% polymer and 80% chloroform. All percentages are by volume.

To this lacquer or vehicle pigments of desired colors such as various metallic oxides are added to produce the following preferred different shades or colors:

1. Pale tissue red
2. Gray blue
3. Red orange
4. Red violet
5. Red brown

The lacquers are applied as by painting with a camel's hair brush, for example, by hand to the bucco-labial surface 20 of either a completed or nearly completed restoration. That is, if the restoration is not quite completed, it is completed usually except for some final polishing and buffing. The chloroform of the lacquers rather rapidly attacks the cured, polymerized surface of the methyl-methacrylate or styrene base material of the restoration and softens it sufficiently that the polymer dissolved in the lacquer may firmly bond to said base material upon the chloroform evaporating. Such evaporating takes place very rapidly, so rapidly in fact, that one layer of lacquer may be placed almost immediately on top of a previously applied layer without one bleeding into the other.

The five colors provided in each set are adequate to naturally color a dental or other type of intra-oral restoration to have a gum surface with a lifelike appearance. The colors may be applied singly to desired areas of the restoration or blending or overlapping of the same may be resorted to in order to produce a desired blended result. If a certain color drys too rapidly or blending is desired, plain chloroform may be used with a brush to dissolve and somewhat rework the colors to the desired effect.

In producing a lifelike appearance on the bucco-labial surface 20 in Fig. 2, for example, the projecting papillae 24 are colored darker than the portion of the base material 22 which is over the simulated root eminences 26, these latter areas usually being relatively light pink as contrasted to the darker red papillae 24. Also dark red or bluish red lines 28, for example, simulating veins, may be applied by a fine brush stroke or nylon fibers. The areas 30 of the restoration adjacent the upper edges of the gum may be colored to have a somewhat gray-blue or brown cast to resemble similar areas in some natural gums. These areas may be blended with other adjacent colored areas to resemble life-like tissue. With a little practice or following a color selector chart, even a novice with only slight artistic ability may become proficient at producing a vari-colored pattern or replica on an intra-oral restoration simulating natural gum tissues.

To further enhance and facilitate the final appearance of the replica produced on a restoration as described above, the preferred embodiment of the invention contemplates the use of a diffusing coating or layer 32 which is composed of a vehicle comprising powdered methyl-methacrylate polymer dissolved in chloroform. From 10 to 20% of polymer is dissolved in from 90 to 80% chloroform. The preferred proportion is 15% polymer and 85% chloroform. All percentages are by volume. Pure talc, powdered glass ground to between 300 and 400 mesh, is added to said vehicle in the preferred proportion of 1 part talc to 4 parts vehicle, by volume. To this mixture, a very small amount of metallic red oxide is added and mixed thoroughly to produce a definite pale pink hue.

This diffusing fluid is used to coat the previously colored bucco-labial surface 120 of the restoration and the talc or glass in the diffusing fluid has a slight masking effect which blends or smooths out any sharp lines of demarcation between colors, for example. Depth and three-dimensional effect is also given thereby to the colors. This materially aids in producing a lifelike effect in the finished, vari-colored effect of the bucco-labial surface of the restoration. The chloroform of the diffusing fluid rapidly evaporates and also softens the undercoats of colored lacquer so that the diffusing coat firmly bonds to said undercoats which, in turn, have bonded to the base material 22.

Once the desired vari-colored replica or pattern of gum tissues has been formed on a restoration, it is preferred that a substantially transparent barrier or protective layer, which might be termed a glaze coat 34, see Fig. 3, is applied over the tissue replica. This glaze coat is preferably composed of 20% powdered methyl-methacrylate polymer dissolved in 80% chloroform, by volume. Successive layers of this glaze coating liquid are applied entirely over the colored gum tissue replica, each layer almost instantly drying.

A protective glaze coat of about .015" to .020" is preferred to provide a sufficiently thick layer that finish polishing and buffing is possible without danger of the color layers being contacted by the polishing or buffing wheels. Also, normal abrasion in use of the restoration will be sustained by this glaze coat and thus prevent harm to or depreciation of the color layers and portions bonded to the base material 22 of the bucco-labial areas 20.

From the foregoing, it will be seen that the present invention provides means and a process to form a replica of natural appearing vari-colored gum tissues on an intra-oral restoration and particularly the bucco-labial surface thereof. The process of forming such replica is far less expensive than any replicas heretofore possible, yet the results are equal, if not superior, to even the most expensive presently available in the profession. Restorations having gum replicas embodying the principles of the present invention are available to the average public in modest financial circumstances rather than merely the wealthy as was heretofore the situation regarding previously available gum replicas on intra-oral restorations.

The new replicas are firmly bonded to the denture base material and thus are durable, the colors of the replica also being highly resistant to bleaching or any other change in shade. Further, after only slightly practice, or with the use of a color selector chart, the average laboratory technician can easily acquire a highly acceptable technique of applying the various colored lacquers, the diffusing coating, and the glaze coat or layer to produce a vari-colored replica of natural gum tissues on the intra-oral restoration such as a denture so shown in Figs. 2 and 3.

The diffusion or refraction is accomplished by placing on or in the outer surface of the artificial denture particles having diffusory or refractive properties such as ground glass, magnesium oxide, talc, diatomaceous earth, carbon black, tin oxide and other metallic oxides, etc. Thus, the present invention enables the employment of light diffusion and reduction of the refractive index of the denture surface.

It will be apparent that artificial teeth made of synthetic resins likewise may be surface treated by virtue of the present invention to provide a diffusion layer.

While the invention has been described and illustrated in its preferred embodiment, it is to be understood that the invention is not to be limited to the precise details herein illustrated and described since the same may be carried out in other ways, falling withing the scope of the invention as claimed.

I claim:

1. An intra-oral restoration molded from a base material selected from the group consisting of methyl-methacrylate and styrene and cured, a vari-colored replica of natural gum tissues bonded to an exterior surface of said restoration, said replica being composed of vari-colored lacquers comprising by volume from 15 to 25% methyl-methacrylate polymer dissolved in from 85 to 75% chloroform, and a slightly pink colored diffusing coating extending over and bonded to said colored replica to minimize lines of demarcation of said colors, and give depth thereto said diffusing coating consisting of approximately 4 parts by volume of a vehicle comprising by volume from 10 to 20% methyl-methacrylate polymer dissolved in from 90 to 80% chloroform and having suspended therein approximately one part of powdered material selected from the group consisting of talc and glass of between 300 and 400 mesh to which a very small amount of metallic red oxide has been added.

2. The intra-oral restoration of claim 1 further including a glaze coat bonded over the diffusing coating and comprising by volume from 15 to 20% methyl-methacrylate polymer dissolved in from 85 to 80% chloroform.

3. The intra-oral restoration of claim 2 further characterized by said colored lacquer comprising 20% methyl-methacrylate polymer and 80% chloroform by volume, and the vehicle of said diffusing coating comprising 15% methyl-methacrylate and 85% chloroform.

4. The intra-oral restoration of claim 1 further characterized by said colored lacquer comprising 20% methyl-methacrylate polymer and 80% chloroform by volume, and the vehicle of said diffusing coating comprising 15% methyl-methacrylate and 85% chloroform.

5. A process of producing an intra-oral restoration of molded and cured base material selected from the group consisting of methyl-methacrylate and styrene having vari-colored bucco-labial surfaces, comprising the steps of painting said molded base material with vari-colored chloroform base lacquers containing dissolved methyl-methacrylate polymer to produce a replica of natural gum tissues, the chloroform softening said base material to permit firm bonding of the methyl-methacrylate of said lacquers to said base material, and softening and blending the various colors of the replica by applying a diffusing coating thereto predominately comprising chloroform and in which a minor amount of methyl-methacrylate polymer is dissolved and also a minor amount of powdered material selected from the group consisting of talc and glass is suspended to produce depth of color and three-dimensional effect in said replica.

6. The process of producing an intra-oral restoration as set forth in claim 5 including further the step of protecting said replica as blended by said diffusing coating by applying over and bonding to said diffusing coating a glaze coat comprising predominantly chloroform and in which methyl-methacrylate polymer is dissolved.

References Cited in the file of this patent
UNITED STATES PATENTS 2,659,970      Ingersoll, Jr. _____ Nov. 24, 1953

OTHER REFERENCES

Ellis, Carleton: "The Chemistry of Synthetic Resins," vol. II, 1953, page 1078. (Copy in Division 25.)

Gregory, Thomas C.: "Uses and Application of Chemical and Related Industries," page 583. (Copy in Division 25.)